United States Patent
Cattaneo et al.

(10) Patent No.: US 10,560,006 B2
(45) Date of Patent: Feb. 11, 2020

(54) METHOD TO APPLY AN INSULATION

(71) Applicant: General Elecric Technology GmbH, Baden (CH)

(72) Inventors: Luigi Cattaneo, Milan (IT); Erminio Merati, Sesto San Giovanni (IT); Giorgio Torre, Sesto San Giovanni (IT); Massimiliano Visintin, Massimiliano (CH)

(73) Assignee: General Electric Technology GmbH, Baden (CH)

( * ) Notice: Subject to any disclaimer, the term of this patent is extended or adjusted under 35 U.S.C. 154(b) by 75 days.

(21) Appl. No.: 15/438,279

(22) Filed: Feb. 21, 2017

(65) Prior Publication Data
US 2017/0257011 A1    Sep. 7, 2017

(30) Foreign Application Priority Data

Mar. 7, 2016  (EP) ..................... 16158910

(51) Int. Cl.
*H02K 15/00*   (2006.01)
*H02K 15/10*   (2006.01)
(Continued)

(52) U.S. Cl.
CPC ............. *H02K 15/105* (2013.01); *H02K 3/51* (2013.01); *H02K 15/0043* (2013.01);
(Continued)

(58) Field of Classification Search
CPC .. H02K 15/105; H02K 15/12; H02K 15/0043; H02K 3/51; H02K 3/38;
(Continued)

(56) References Cited

U.S. PATENT DOCUMENTS

| | | | |
|---|---|---|---|
| 3,034,479 A | 5/1962 | Larsh et al. | |
| 5,415,892 A | 5/1995 | Nishizawa | |
| 2011/0123785 A1* | 5/2011 | Garcia | A63H 27/10 428/203 |

FOREIGN PATENT DOCUMENTS

| | | |
|---|---|---|
| CA | 1009289 A | 4/1977 |
| EP | 2 503 673 B1 | 10/2015 |

(Continued)

OTHER PUBLICATIONS

English Translation of DE 19547251 (Drechsler).*
(Continued)

*Primary Examiner* — Thiem D Phan
(74) *Attorney, Agent, or Firm* — James W. Pemrick; Hoffman Warnick LLC

(57) ABSTRACT

The present disclosure relates to a method to apply an insulation to a retaining ring for end windings of an electric machine and to a fillable bag to apply an insulation to a retaining ring. Disclosed is a method to apply an insulation to a retaining ring for end windings of an electric machine, with the steps of providing a retaining ring housing, attaching an insulation at the inside of the retaining ring housing, and inflating a bag inside the retaining ring housing to apply pressure to the insulation. Also disclosed is a fillable bag to apply a pressure to an electric insulation inside a retaining ring for end windings of an electric machine.

8 Claims, 1 Drawing Sheet

(51) Int. Cl.
  *H02K 3/51* (2006.01)
  *H02K 15/12* (2006.01)
  *H02K 3/38* (2006.01)
(52) U.S. Cl.
  CPC .............. *H02K 15/12* (2013.01); *H02K 3/38* (2013.01); *Y10T 29/49009* (2015.01)
(58) Field of Classification Search
  CPC .............. F24H 1/182; Y10T 29/49009; Y10T 29/49012; Y10T 29/5141
  USPC .......................... 29/596, 597, 598, 732, 734
  See application file for complete search history.

(56) References Cited

FOREIGN PATENT DOCUMENTS

GB          832100 A     4/1960
GB        2 403 074 A   12/2004

OTHER PUBLICATIONS

Extended European Search Report and Opinion issued in connection with corresponding EP Application No. 16158910.6 dated Sep. 13, 2016.

\* cited by examiner

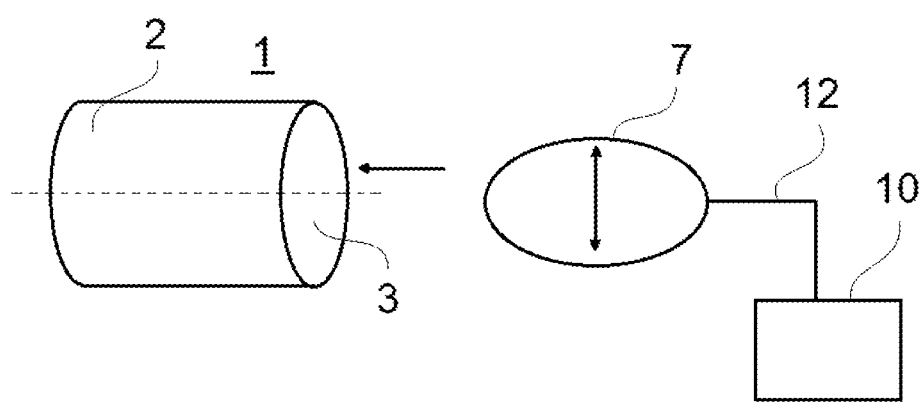

METHOD TO APPLY AN INSULATION

TECHNICAL FIELD

The present disclosure relates to a method to apply an insulation to a retaining ring for end windings of an electric machine and to a fillable bag to apply an insulation to a retaining ring.

BACKGROUND

Retaining rings are commonly fixed to end parts of the coils or windings of rotors of high power electric machines. The retaining rings mainly serve to mechanically stabilize the end parts, also referred to as end windings. The main parts of the windings are housed in the rotor slots, the end windings of the rotor however protrude outside of the slots and are in the case of high power generators bent in relation to the main winding part. To this end the retaining ring is fabricated as massive cylinder which encloses the end windings. Some retaining rings are internally insulated. The insulation is an electric insulation and consists of several layers of fibreglass with a layer thickness in the range of millimeters. The insulation layers can further be teflonized, i.e. a layer of polytetrafluoroethylene can be applied. The insulation layers are attached at the inside of the retaining ring by gluing with hot curing resin. Presently, with the need to replace the insulation of the retaining ring expensive tools are used. These tools are expansible steel cones or cylinders depending on the geometry of the retaining ring. The expansible steel cones or cylinders exert a pressure to the inside of the retaining ring with applied insulation. This high pressure is necessary to obtain a sufficient bond between the two different materials of the retaining ring and the insulation.

BRIEF DESCRIPTION

It is an object of the invention to simplify the application of an insulation to a retaining ring of an electric machine. This object is solved with the features of a method to apply an insulation to a retaining ring and with the features of a fillable bag to apply a pressure to an insulation of a retaining ring as disclosed herein.

In one aspect of the invention a method is disclosed to apply an insulation to a retaining ring for end windings of an electric machine, with the steps of providing a retaining ring housing, attaching an insulation at the inside of the retaining ring housing, and filling a bag with a medium inside the retaining ring housing to apply pressure to the insulation. Further, disclosed is a fillable bag to apply a pressure to an insulation inside a retaining ring for end windings of an electric machine. The bag is to be filled with a medium which is a gas or a liquid. The term fillable in this disclosure is to be understood that the bag can be filled with a gas or a liquid, e.g. air or water. The terms gas and liquid fall under the generic term medium in this disclosure, also referred to as gaseous medium and liquid medium. In case of filling the bag with a gas or gaseous medium the bag is to be referred to as being inflatable.

Further examples of the invention are disclosed below.

In an example of the invention the bag comprises a chloroprene tissue. This material is particularly suitable in terms of tensile strength and stability. In a further related example the bag is fabricated from chloroprene tissue with at least two glued layers. This measure among others improves the relevant material properties. In another example the glue is a bonding resin.

In a further example of the invention the bag is pressed against the insulation inside the retaining ring with a pressure of below nine bars by means of filling the bag.

BRIEF DESCRIPTION OF THE DRAWINGS

FIG. 1 shows a schematic view of a retaining ring with an insulation at the inside, a compressor which fills a fillable bag with a medium via an inlet tube, with the fillable bag to be inserted into the retaining ring.

DETAILED DESCRIPTION OF EXEMPLARY EMBODIMENTS

With reference to the figure, this illustrates the method to apply an electric insulation to a retaining ring by means of a fillable or inflatable bag.

FIG. 1 shows a schematic view of a retaining ring 1 at the left. The retaining ring 1 is mainly composed of a retaining ring housing 2 which is fabricated as a cylinder from massive steel alloy. The retaining ring 1 commonly encloses end windings of huge electric machines when assembled, as turbogenerators. An electric insulation 3 is attached to the inside of the retaining ring housing 2. The electric insulation 3 serves as means to preclude short circuits. The electric insulation 3 is made from a multi-layer fiberglass. At least one layer of the multi-layer fiberglass is covered with polytetrafluoroethylene. First, a layer of glue, in particular a hot curing resin, is applied to the inside of the retaining ring housing 2. The glue has a heat resistance of up to 90° in this example. Next, the electric insulation 3 is applied to the faces inside the retaining ring 1 onto the layer of glue to stick the electric insulation 3 to the retaining ring housing 2. A fillable bag 7 is provided at the place of manufacture or maintenance of the retaining ring 1. This fillable bag 7 comprises a chloroprene tissue of two or more layers which are glued to form one unity. Further materials for the fillable bag 7 can be provided which are stable, have a sufficient resiliency, and are easy to ship to the place for maintenance of the retaining ring 1. The fillable bag 7 has an opening to connect an inlet tube 12 from the outside. The inlet tube 12 is connected to a compressor 10 at the other end. Via the inlet tube 12 the compressor 10 pumps and draws air or water into and from the fillable bag 7 and by this fills or drains the bag 7, respectively. In case a gas is filled into the bag 7, the bag 7 is inflated or deflated, respectively, in this manner. The compressor 10 can also pump different gaseous mediums or liquid mediums into the bag 7 than air or water. The fillable or inflatable bag 7 is inserted into the retaining ring 1 when the diameter of the bag 7 is smaller than the diameter of the retaining ring 1 and when the bag 7 is merely partly inflated. The insertion direction of the bag 7 into the retaining ring 1 is illustrated by the left arrow. This allows the operator to comfortably place the lightweight bag 7 into the retaining ring 1 manually. The fillable bag 7 fills the complete space inside the retaining ring 1 then. The surface of the bag 7 abuts the applied electric insulation 3 at the inside of the retaining ring housing 2. The operator activates the compressor 10 such that compressed air is conducted under pressure through the inlet tube 12 and the opening in the bag 7 into the bag 7. The compressor 10 exerts a pressure of several bars to the inside of the bag 7. The pressure created by the compressor 10 is adjustable up to nine bars, although also higher pressures can be created. Consequently, the fillable bag 7 increases the volume, the elastic material of the bag 7 expands. This expansion of the bag 7 is illustrated by the double-ended arrow inside the bag 7. The bag 7 presses to the outside in the radial direction, the created pressure is transferred to the electric insulation 3, the glue, and the wall of the retaining ring housing 2. The exerted pressure is necessary to enable a durable and safe bonding of the electric insulation 3 to the retaining ring housing 2. Depending on the used glue, a hot curing resin, the pressure in the bag 7 is kept over a time of several hours. When the glue is thoroughly cured the electric insulation 3 is securely fixed nearly inseparably to the inside of the retaining ring 1. The bond is fabricated reliably due to high operation requirements to the rotating rotor and the retaining ring 1. The operator activates the compressor 10 to reduce the pressure to the bag 7 to deflate the bag 7. Thus reduced the diameter the material of the bag 7 releases from the electric insulation 3 at the inside surface of the retaining ring 1. The fillable bag 7 is removed without difficulty from the finished retaining ring 1 by the operator in the next operation step. The described method is especially useful in maintenance work on retaining rings 1 when replacing the electric insulation 3 by a new one. The compressor 10 and the inflatable or fillable bag 7 are easy to handle by the operator, in particular easy and cheap to transport.

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents.

What is claimed is:

1. A method to apply an insulation to a retaining ring, the retaining ring used for end windings of an electric machine, comprising the steps of:
    providing a retaining ring housing;
    attaching an insulation to an inside face of the retaining ring housing;
    inserting a bag inside the retaining ring housing, the bag abutting the insulation; and
    filling or inflating the bag with a medium, inside the retaining ring housing to apply pressure to the insulation and to the inside face of the retaining ring housing.

2. The method according to claim 1, wherein the bag comprises a chloroprene tissue.

3. The method according to claim 2, further comprising fabricating the bag from chloroprene tissue with at least two glued layers.

4. The method according to claim 3, wherein the glue is a bonding resin.

5. The method according to claim 1, further comprising applying pressure to insulation inside the retaining ring with a pressure below nine bar.

6. The method according to claim 1, further comprising filling the bag with a liquid medium.

7. The method according to claim 1, further comprising inflating the bag with air.

8. A fillable bag to apply a pressure to an insulation attached to an inside face of a retaining ring, the retaining ring used for end windings of an electric machine, wherein the insulation is attached to the inside face of the retaining ring according to the method of claim 1.

* * * * *